US010024443B2

(12) United States Patent
Sensabaugh et al.

(10) Patent No.: US 10,024,443 B2
(45) Date of Patent: Jul. 17, 2018

(54) HYDRAULIC CIRCUITRY FOR SKID STEER LOADER VALVE

(71) Applicant: Parker-Hannifin Corporation, Cleveland, OH (US)

(72) Inventors: Chuck Sensabaugh, Antwerp, OH (US); Dennis Reynolds, Fort Wayne, IN (US); Brian Slattery, Hicksville, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 88 days.

(21) Appl. No.: 15/176,796

(22) Filed: Jun. 8, 2016

(65) Prior Publication Data
US 2016/0363227 A1 Dec. 15, 2016

Related U.S. Application Data

(60) Provisional application No. 62/173,159, filed on Jun. 9, 2015.

(51) Int. Cl.
*F16K 11/07* (2006.01)
*E02F 3/34* (2006.01)
*E02F 9/22* (2006.01)

(52) U.S. Cl.
CPC ............ *F16K 11/07* (2013.01); *E02F 3/3414* (2013.01); *E02F 9/2228* (2013.01); *E02F 9/2267* (2013.01); *Y10T 137/8671* (2015.04); *Y10T 137/87185* (2015.04); *Y10T 137/87225* (2015.04); *Y10T 137/87885* (2015.04)

(58) Field of Classification Search
CPC ............... F16K 11/07; Y10T 137/8671; Y10T 137/87885; Y10T 137/87185; Y10T 137/87225; E02F 3/3414; E02F 9/228; E02F 9/2267
USPC ..... 137/625.69, 884, 596.13, 596.18; 91/445
See application file for complete search history.

(56) References Cited

U.S. PATENT DOCUMENTS

| 3,329,169 A | 7/1967 | Hodgson et al. |
| 3,357,451 A | 12/1967 | Tennis |
| 3,602,259 A | 8/1971 | Martin |

(Continued)

OTHER PUBLICATIONS

Husco Model 9210 Monoblock Valve catalog, pp. 2 and 5.

(Continued)

*Primary Examiner* — John K Fristoe, Jr.
*Assistant Examiner* — Kelsey Cary
(74) *Attorney, Agent, or Firm* — Renner, Otto, Boisselle & Sklar, LLP

(57) ABSTRACT

Arrangements of a flow path to achieve a series circuit, a regeneration circuit and a float/passive regeneration circuit. For example, a valve body having a spool bore, a valve inlet, a plurality of cavities opening into the spool bore and a spool disposed in the spool bore. A first cavity fluidly connected to a tank passage, a second cavity fluidly connected to a first work port, a third cavity fluidly connected to an inlet of another valve, a fourth cavity fluidly connected to a second work port, a fifth cavity fluidly connected to the valve inlet, a sixth cavity fluidly connected to the first work port, a seventh cavity, an eighth cavity fluidly connected to the valve inlet, a ninth cavity fluidly connected to the inlet of the other valve and a tenth cavity fluidly connected to the valve inlet.

26 Claims, 11 Drawing Sheets

(56) References Cited

U.S. PATENT DOCUMENTS

| | | | |
|---|---|---|---|
| 3,991,787 A | * | 11/1976 | Schmitt .................... B66D 1/44 |
| | | | 137/596.13 |
| 4,167,197 A | | 9/1979 | Maki et al. |
| 4,408,518 A | | 10/1983 | Diel et al. |
| 4,844,685 A | | 7/1989 | Sagaser |
| 5,755,260 A | | 5/1998 | Cho |
| 6,505,645 B1 | | 1/2003 | Pack et al. |
| 8,316,757 B2 | | 11/2012 | Rinaldi |

OTHER PUBLICATIONS

Walvoil catalog SDM141E catalog DAT008E, 7$^{th}$ edition, May 2001, p. 6.
Parker VA20/35, VG20/25, bulletin HY14-2004-B1/US, pp. 8 and 9.
Parker Model V20 catalog GPD-1106, rev. 1/91 pp. 12 and 38.
Parker MD04 and MD06 bulletin HY14-2731-B1/US, Feb. 1, 2004, p. 2.
Parker V17 casting drawing 24299000 & V17 assembly 24282002.

* cited by examiner

HYDRAULIC CIRCUITRY FOR SKID STEER LOADER VALVE

RELATED APPLICATION DATA

This application claims the benefit of U.S. Provisional Application No. 62/173,159 filed Jun. 9, 2015, which is hereby incorporated herein by reference.

FIELD OF INVENTION

The present invention relates generally to hydraulic valves, and more particularly to a hydraulic valve assembly for use with skid steer loaders, for example.

BACKGROUND

A skid-steer loader, skid loader, or skidsteer, is a type of small hydraulic vehicle with a generally rigid frame having lift arms used to attach a variety of labor-saving tools or attachments, and is typically powered with an on-board engine. Skid-steer loaders are typically four-wheel vehicles with the wheels mechanically locked in synchronization on each side and locked in driving orientation to the vehicle (i.e., they do not turn left or right). The left-side drive wheels can be driven independently of the right-side drive wheels. The machine turns by skidding, or dragging its fixed-orientation wheels across the ground. Skid-steer loaders are capable of zero-radius turns, making them extremely maneuverable and valuable for applications that require a compact, agile loader. Skid-steer loaders are sometimes equipped with tracks in lieu of the wheels and such a vehicle is known as a "compact track loader." Unlike in a conventional front loader, the lift arms in these machines are alongside the driver with the pivot points behind the driver's shoulders.

The hydrostatic drive mechanism for driving the wheels may be interconnected with the hydraulic system controlling the lift and tilt cylinders of the boom assembly of the skid-steer vehicle.

A valve assembly is a hydraulic device that controls hydraulic fluid from a hydraulic pump to different movable members in hydraulic systems such as construction and industrial equipment. Each movable member is controlled by a hydraulic section that consists of a body with a pair of work ports, and a pump inlet and tank outlet. A control spool inside the body controls the flow of fluid to and from the different ports. An assembly can consist of a single section to operate a single movable member or a plurality of sections to operate a plurality of movable members. If multiple movable members are involved, one of the methods of controlling the flow of fluid is an industry accepted hydraulic circuit identified as a series circuit. The series circuit allows the different movable members to be connected to each other by way of the valve assembly. This connection offers an advantage of recycling return flow from moving members that are activated to downstream moving members.

SUMMARY OF INVENTION

The present application offers unique arrangements of the flow path to achieve a series circuit, a regeneration circuit and a float/passive regeneration circuit.

According to one aspect of the invention, a hydraulic valve assembly includes a valve body having a spool bore, a valve inlet, and a plurality of cavities opening into the spool bore; and a spool disposed in the spool bore. The plurality of cavities includes: a first (tank) cavity fluidly connected to a tank passage; a second (B port) cavity adjacent the first cavity and fluidly connected to a first work port (work port B); a third (downstream) cavity adjacent the second cavity and fluidly connected to an inlet of a another valve; a fourth (A port) cavity adjacent the third cavity and fluidly connected to a second work port (work port A); a fifth (bridge) cavity adjacent the fourth cavity and fluidly connected to the valve inlet; a sixth (B port) cavity adjacent the fifth cavity and fluidly connected to the first work port; a seventh cavity adjacent the sixth cavity; an eighth (upstream) cavity adjacent the seventh cavity and fluidly connected to the valve inlet; a ninth (downstream) cavity adjacent the eighth cavity and fluidly connected to the inlet of the other valve; and a tenth (upstream) cavity adjacent the ninth cavity and fluidly connected to the valve inlet.

Optionally, the fifth cavity is fluidly connected to the valve inlet via a check valve.

Optionally, the check valve allows fluid flow from the valve inlet to the fifth cavity and prevents fluid flow from the fifth cavity to the valve inlet.

Optionally, the third cavity is fluidly connected to the inlet of the other valve via a check valve.

Optionally, the check valve prevents fluid flow from the inlet of the other valve to the third cavity and allows fluid flow from the third cavity to the inlet of the other valve.

Optionally, the eighth cavity is directly fluidly connected to the valve inlet.

Optionally, the ninth cavity is directly fluidly connected to the inlet of the other valve.

Optionally, the tenth cavity is directly fluidly connected to the valve inlet.

Optionally, the seventh (downstream) cavity is fluidly connected to the inlet of the other valve.

Optionally, the seventh cavity is fluidly connected to the third cavity.

Optionally, the seventh cavity is fluidly connected to the inlet of the other valve via a check valve.

Optionally, the check valve allows flow from the seventh cavity to the inlet of the other valve and prevents flow from the inlet of the other valve to the seventh cavity.

Optionally, the inlet is connected to a dedicated drain line via a pressure relief valve. Optionally, this valve is set to open at approximately 4000 psi.

Optionally, the seventh (bridge) cavity is fluidly connected to the valve inlet.

Optionally, the seventh cavity is fluidly connected to the fifth cavity.

Optionally, the seventh cavity is fluidly connected to the valve inlet via a check valve.

Optionally, the check valve allows fluid flow from the valve inlet to the seventh cavity and prevents flow from the seventh cavity to the valve inlet.

Optionally, the fourth cavity is fluidly connected to the tank passage via a pressure relief valve.

Optionally, the second cavity is fluidly connected to the tank passage via a pressure relief valve.

Optionally, the spool includes a flow path (external) from the eighth cavity to the ninth cavity when the spool is in a neutral position, thereby fluidly connecting the valve input to the input of the other valve.

Optionally, the spool includes a flow path (external) from the tenth cavity to the ninth cavity when the spool is in a neutral position, thereby fluidly connecting the valve input to the input of the other valve.

Optionally, the spool includes a flow path (external) from the fifth cavity to the sixth cavity when the spool is in a first position displaced from neutral in a first direction, thereby fluidly connecting the valve input to the first work port.

Optionally, the spool includes a flow path (external) from the third cavity to the fourth cavity when the spool is in a first position displaced from neutral in a first direction thereby fluidly connecting the second work port to the input of the other valve.

Optionally, the spool includes a flow path (external) from the fourth cavity to the fifth cavity when the spool is in a second position displaced from neutral in a second direction (opposite the first direction), thereby fluidly connecting the valve input to the second work port.

Optionally, the spool includes a flow path (external) from the sixth cavity to the seventh cavity when the spool is in a second position displaced from neutral in a second direction (opposite the first direction) thereby fluidly connecting the first work port to the input of the other valve.

Optionally, the spool includes a flow path (internal) from the first cavity to the second cavity when the spool is in a third position displaced from neutral (beyond the second position) in the second direction, thereby fluidly connecting the first work port to the tank.

Optionally, the spool includes a flow path (internal) from the first cavity to the fourth cavity when the spool is in a third position displaced from neutral (beyond the second position) in the second direction, thereby fluidly connecting the second work port to the tank.

Optionally, the spool includes a flow path (internal) from the second cavity to the fourth cavity when the spool is in a third position displaced from neutral (beyond the second position) in the second direction, thereby fluidly connecting the first work port to the second work port.

Optionally, the spool includes a flow path (external) from the eighth cavity to the ninth cavity when the spool is in a third position displaced from neutral (beyond the second position) in the second direction, thereby fluidly connecting the valve input to the input of the other valve.

Optionally, the spool includes a flow path (external) from the tenth cavity to the ninth cavity when the spool is in a third position displaced from neutral (beyond the second position) in the second direction, thereby fluidly connecting the valve input to the input of the other valve.

Optionally, the spool includes a flow path (external) from the second cavity to the third cavity when the spool is in a second position displaced from neutral in a second direction (opposite the first direction) thereby fluidly connecting the first work port to the input of the other valve.

Optionally, the spool includes a flow path (external) from the seventh cavity to the sixth cavity when the spool is in a second position displaced from neutral in a second direction (opposite the first direction), thereby fluidly connecting the first work port to the second work port to provide extra flow to the second work port beyond that supplied via the valve inlet by a pump.

Optionally, the hydraulic valve assembly further includes an eleventh (tank) cavity adjacent the tenth cavity that is fluidly connected to the tank passage.

The foregoing and other features of the invention are hereinafter described in greater detail with reference to the accompanying drawings.

DETAILED DESCRIPTION

Although described herein for conciseness in relation to a skid-steer loader application, exemplary valve assemblies may be used with any number of other hydraulic machines.

Figure 1:
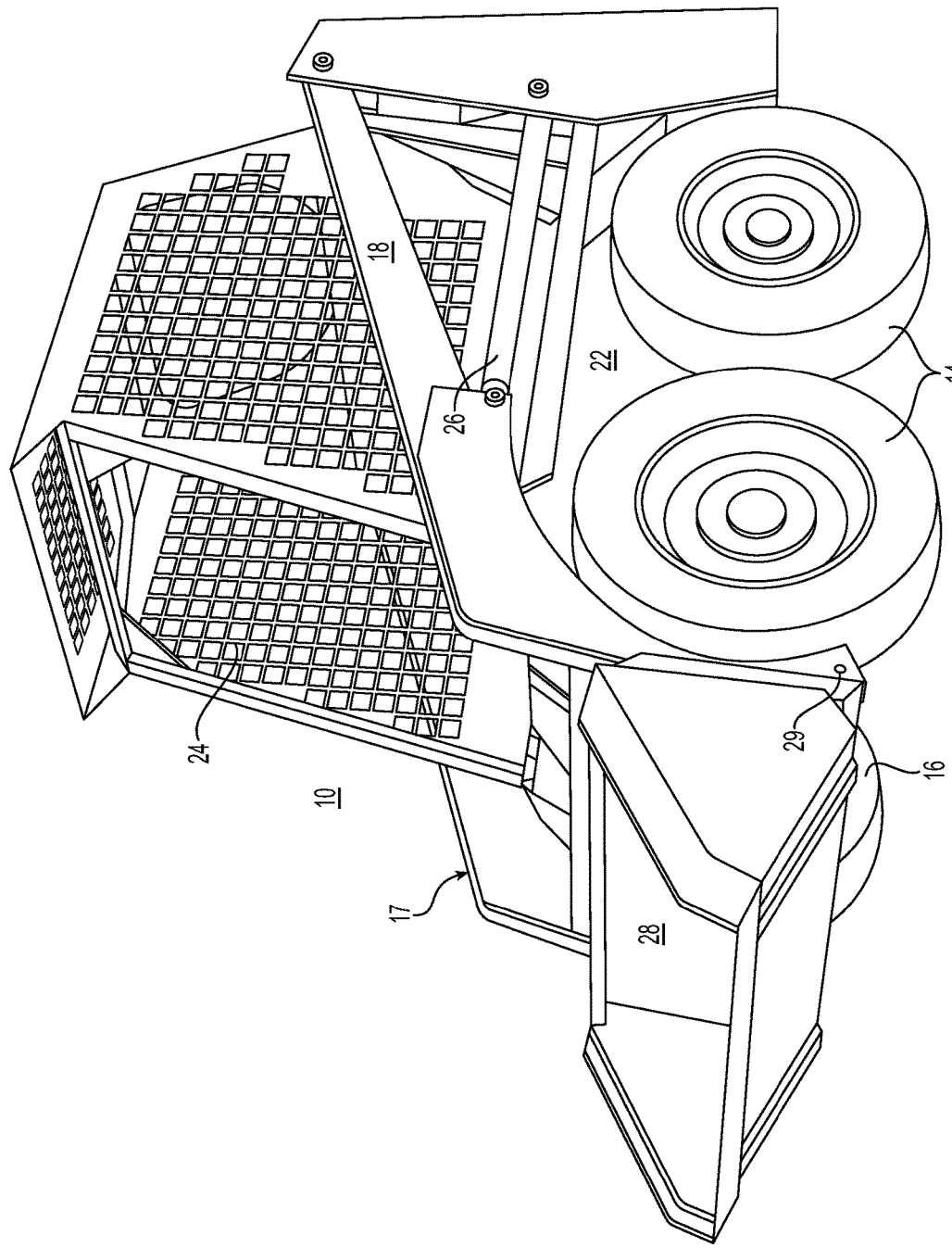
FIG. 1 shows a skid-steer loader that may include an exemplary hydraulic valve assembly.

Referring to FIG. 1, the reference numeral 10 denotes generally a hydraulic vehicle known as a skid-steer loader having a pair of drive wheels 14 on one side and a pair of drive wheels 16 on the other side. The vehicle 10 is equipped with a boom assembly 17 having a pair of boom arms 18 pivotally mounted to the rear of a tractor body portion 22 of the vehicle 10. The boom arms 18 extend forwardly along an operator's compartment 24. The boom arms 18 are raised and lowered by lift cylinders 26 pivotally connected at one end to the body and at an opposite end to a forward portion of the boom arm 18. The boom assembly 17 has mounted at a forward end portion an attachment such as a bucket 28. The bucket 28 is pivotally connected to the boom assembly 17 at respective lower front ends of the boom arms 18 at respective pivotal connections 29.

A valve assembly is part of the hydraulic vehicle and controls hydraulic fluid from a hydraulic pump to different movable members in the system. Hydraulic valves are connected to the pump and a tank/reservoir and connected to consumers/movable members or actuators of the system. Examples of these movable members are cylinders and hydraulic motors. The flow of fluid to and from each movable member is typically controlled by a control spool, which in turn is controlled manually or by hydraulic proportional pressure reducing valves, that themselves are controlled either manually or electro-hydraulically. The movement of the control spool, which resides in a bore inside the hydraulic valve, opens and closes passages between the movable members and hoses or pipes that connect to a pump 101 and a tank 103. The description of points along any flow path of fluid has by industry conventions, two points, upstream and downstream. Upstream is the point in the flow path that is closer to the flow source and downstream is the point closer to the tank. The valve assembly described in this application is, for conciseness, a monocast valve, which is a single housing that incorporates an inlet port, a tank port and three pairs of work ports and three moving control spools. The assembly need not be monocast, and more or fewer spools may be included. Each spool is connected to a pair of work ports and the inlet and the tank ports. In addition to the work ports and moving control spools, there are multiple control spool actuators, flow checks and relief valves that assist with the flow and pressure management of the hydraulic circuit inside the valve. There are passages, called cores or cavities, inside the valve that provide the connections to the inlet port, tank port and the pair of work ports to each spool. The placement of these cavities and their interaction with the movable spools create a hydraulic circuit including a series—with a $4^{th}$ position float and passive regeneration function—a series or a series/regeneration circuit, and a tandem circuit.

Figure 2:
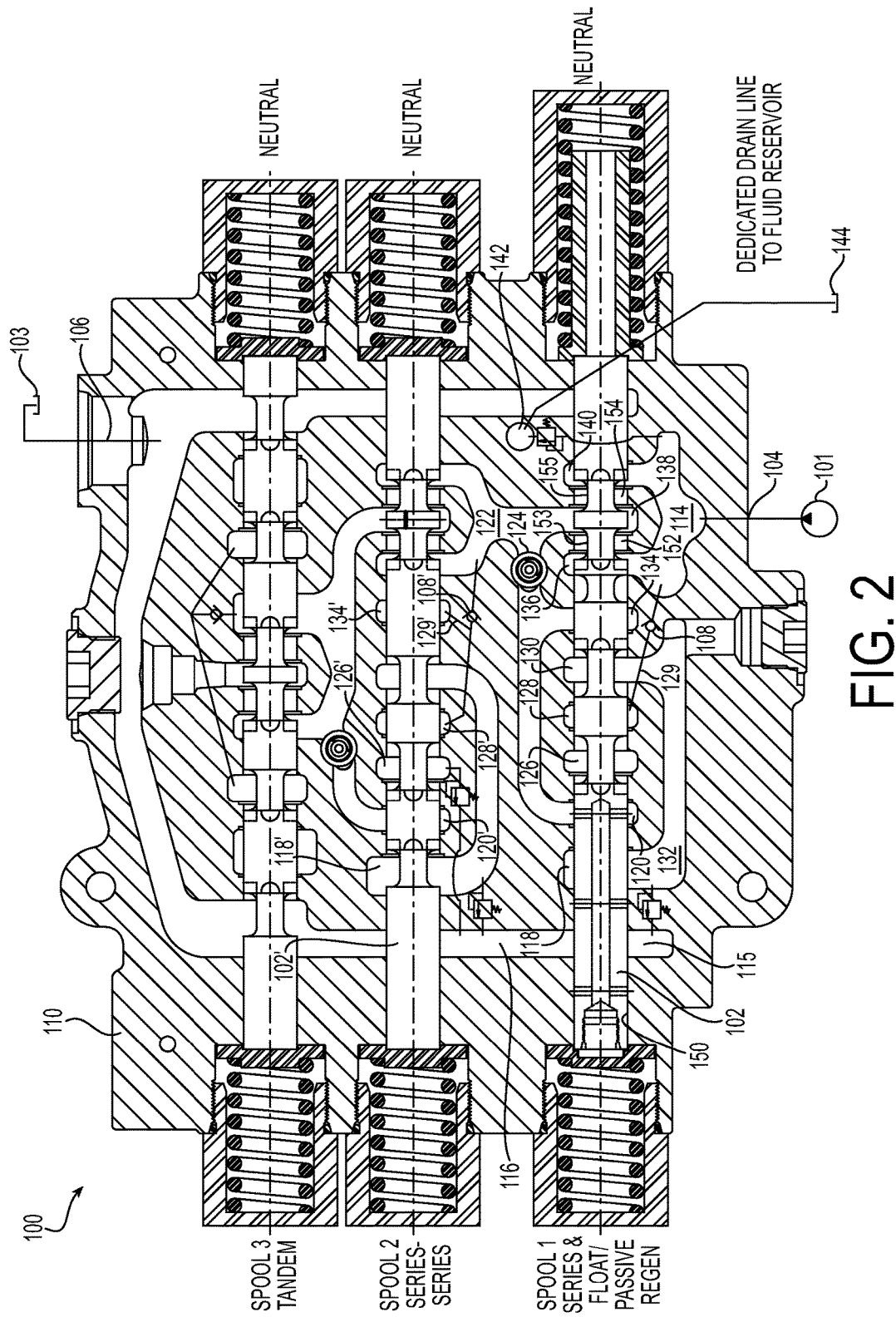
FIG. 2 shows an exemplary hydraulic valve assembly having three work sections with the first work section being a series and float/passive regeneration configuration and the second work section being a series-series configuration.

Referring now to FIG. 2, an exemplary hydraulic valve assembly is shown at 100. Beginning with the spool 102 nearest the inlet port 104, this worksection forms a series circuit with a $4^{th}$ position float and passive regeneration function. To construct the series circuit, the spool 102 and core arrangement does three things whenever the spool is moved to energize a work port. First, it shuts the communication of the upstream core to the downstream core. This severs the connection between the inlet port 104 and the tank port 106. Second, it opens communication from the upstream core to one of the work ports associated with the control spool 102. This communication includes a transition check valve 108 that allows fluid flow only in the direction of upstream core to work port core. Third, it opens communication from the other work port core, associated with the control spool, to the downstream core. This opening and shutting of the different cores will allow the fluid flow to be from the inlet to work port B to the movable member on the machine to work port A to a downstream worksection. If the spool is moved in the opposite direction, the same event occurs, but the fluid flow direction is reversed. The fluid flow will be from the inlet to work port A to the movable member on the machine to work port B to the downstream. Both of these fluid flows describe a series circuit. In addition to the two work positions described above, the spool can be moved to a further position that will reconnect the communication between the upstream core and downstream core and connect both work port A and work port B to each other, making this a passive regeneration circuit. Also, both work port A and work port B are connected to the tank core, making this a float circuit. A passive regeneration circuit is different from a regeneration circuit because it only allows communication between the work ports and it does not allow communication of the inlet port to the work ports. The cores or cavities of the first bore, starting with the side left of the inlet are as follows: tank, work port B, downstream, work port A, bridge, work port B, downstream, upstream, downstream, upstream, tank. The spool may be configured to provide pathways utilizing external and/or internal flow paths along the spool axis.

The hydraulic valve assembly 100 includes a valve body 110 housing the one or more worksections inside. The first (bottom most in the figures) worksection includes a spool bore 112, a valve inlet 114, and a plurality of cavities opening into the spool bore 112. The spool 102 is disposed in the bore and is longitudinally movable therein. The spool 102 has a neutral position and may be displaced from the neutral position in either direction.

The cavities will now be described from left to right according to FIG. 2, but it is understood that the orientation of the cavities may be flipped.

The first cavity is a tank cavity 115 that is fluidly connected to a tank passage 116. This tank passage 116 extends through the body 110 to connect with multiple other tank cavities, thereby providing a common tank passage leading to the tank port 106 from these tank cavities.

The second or "B" cavity 118 is adjacent the first/tank cavity 115 (between the first and third cavities) and is fluidly connected to a first work port, called "work port B". This work port would be fluidly connected to a consumer such as a rod side of a cylinder when installed in a vehicle. The second cavity 118 may be fluidly connected to the tank passage via a pressure relief valve to protect the first work port, work port B.

The third or downstream cavity 120 is adjacent the second cavity 118 (between the second and fourth cavities) and is fluidly connected to an inlet of another valve. In particular, the third cavity 120 is connected via a downstream passage (common to the third and seventh cavities) to the inlet 122 of the second worksection, described in more detail below. A check valve 124 may be placed in this passage so as to allow flow towards the inlet 122 and to prevent flow from the inlet 122 back towards the third and seventh cavities.

The fourth or "A" cavity 126 is adjacent the third cavity 120 (between the third and fifth cavities) and is fluidly connected to a second work port, called "work port A". This work port would be fluidly connected to a consumer such as a piston side of a cylinder when installed in a vehicle. The fourth cavity 126 may be fluidly connected to the tank passage via a pressure relief valve to individually protect the second work port, work port A.

The fifth or "bridge" cavity 128 is adjacent the fourth cavity 126 (between the fourth and fifth cavities) and is fluidly connected to the valve inlet 114 via a passage 129 (out of plane and therefore represented schematically in FIG. 2). In the passage 129 may be disposed a check valve 108 that allows flow from the inlet 114 to the cavity 128 but prevents flow from the cavity 128 to the inlet 114. The bridge cavity 128 is situated between cavities connected to the work ports, thereby acting as a sort of staging area into which flow enters before being directed to either the A or B work ports via their connected cavities.

The sixth or "B" cavity 130 is adjacent the fifth cavity 128 (between the fifth and seventh cavities) and is fluidly connected to the first work port, called "work port B". As mentioned above, this work port would be fluidly connected to a consumer such as a rod side of a cylinder when installed in a vehicle. The sixth cavity is connected via a passage 132 to the second cavity 118. Work port B is out of plane, and therefore not shown in FIG. 2.

The seventh cavity 134 is adjacent the sixth cavity 130 (between the sixth and eighth cavities) and is fluidly connected to the inlet 122 of the downstream valve/worksection. In particular, the seventh cavity 134 is connected via a downstream passage (common to the third and seventh cavities) to the inlet 122 of the second worksection, described in more detail below. A check valve 124 may be placed in this passage so as to allow flow towards the inlet 122 and to prevent flow from the inlet 122 back towards the third and seventh cavities.

The eighth or "upstream" cavity 136 is adjacent the seventh cavity 134 (between the seventh and ninth cavities)

and is fluidly connected to the valve inlet 114. Preferably, the eighth cavity 136 is directly fluidly connected to the valve inlet 114 in that the cavity 136 opens into this inlet 114 without an intervening passageway or other connection.

The ninth or "downstream" cavity 138 is adjacent the eighth cavity 136 (between the eighth and tenth cavities) and is fluidly connected to the inlet 122 of the other valve. In other words, this cavity passes flow downstream to the downstream worksection. Optionally, the ninth cavity 138 is directly connected to the inlet 122 without an intervening valves or flow restrictions.

The tenth or "upstream" cavity 140 is adjacent the ninth cavity 138 (between the ninth and eleventh cavities) and fluidly connected to the valve inlet 114. Preferably, the tenth cavity 140 is directly fluidly connected to the valve inlet 114 in that the cavity 140 opens into this inlet 114 without an intervening passageway or other connection.

An eleventh (tank) cavity may be adjacent the tenth cavity 140 and may be fluidly connected to the tank passage 116.

Optionally, the inlet 114 of the first worksection may be fluidly connected to a dedicated drain line 142 via a pressure relief valve 144. The pressure relief valve may be set to open at approximately 4000 psi, for example, in order to prevent damage to upstream system components such as pumps and hoses and downstream system components such as hoses and actuators. The inlet pressure will rise due to the working of the movable machine members. Once the inlet pressure minus the tank pressure is higher than the relief valve setting, the relief opens the connection from the inlet to the tank.

The spool 102 of the first worksection cooperates with the bore 150 and the cavities therein (described above) to route fluid flow through the worksection. As described above, the flow paths there through may be formed external or internal to the spool 102. In external flow paths, although described herein as being part of the spool for the sake of convenience, the flow path is bounded partially by the spool 102 and partially by the bore 150 and the cavities thereat.

Moving to the specifics of spool 102, the spool 102 includes a flow path 152 from the eighth cavity 136 to the ninth cavity 138 when the spool is in a neutral position. As illustrated, this may be an external flow path formed by recess 153 in the spool 102. The flow path fluidly connects the valve input 114 to the input 122 of the other, downstream valve.

The spool 102 also includes a flow path 154 from the tenth cavity 140 to the ninth cavity 138 when the spool is in the neutral position. As illustrated, this may be an external flow path formed in recess 155 in spool 102. The flow path fluidly connects the valve input 114 to the input 122 of the other, downstream valve.

Figure 3:
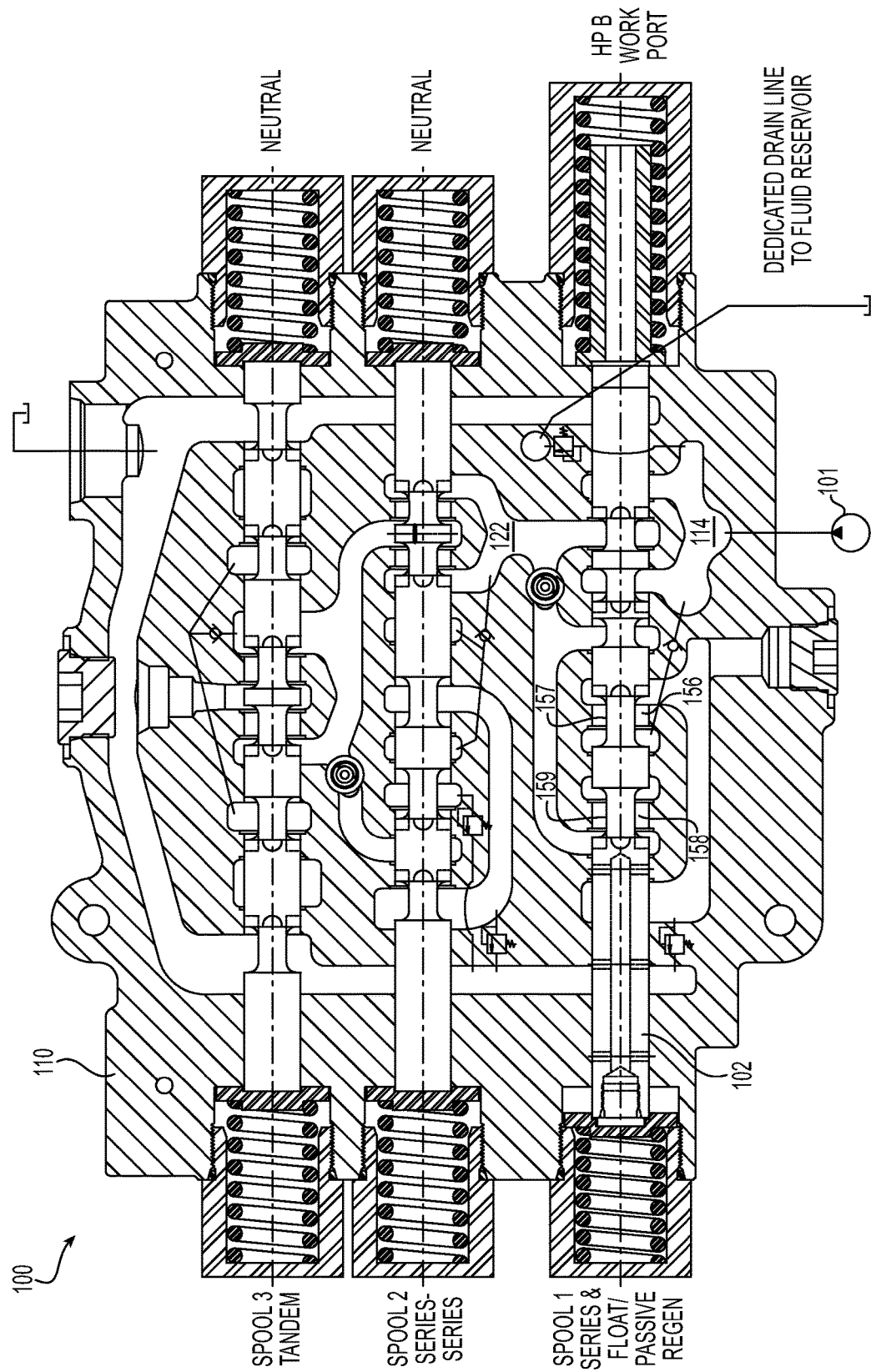
FIG. 3 shows the exemplary hydraulic valve assembly of FIG. 2 with the spool of the first work section displaced to the left.

Turning to FIG. 3, the spool 102 may be moved to a first position displaced from neutral in a first direction. In this case, the spool 102 is moved to the left. This movement shifts the position of the recesses in the spool 102 to close flow paths 152 and 154.

In this position, the spool 102 now opens a flow path 156 from the fifth cavity 128 to the sixth cavity 130 in recess 157, thereby fluidly connecting the valve input 114 to the first work port or work port B.

At the same time, the displaced position of the spool also opens a flow path 158 from the third cavity 120 to the fourth cavity 126 in recess 159, thereby fluidly connecting the second work port or work port A to the input 122 of the downstream valve.

Figure 4:
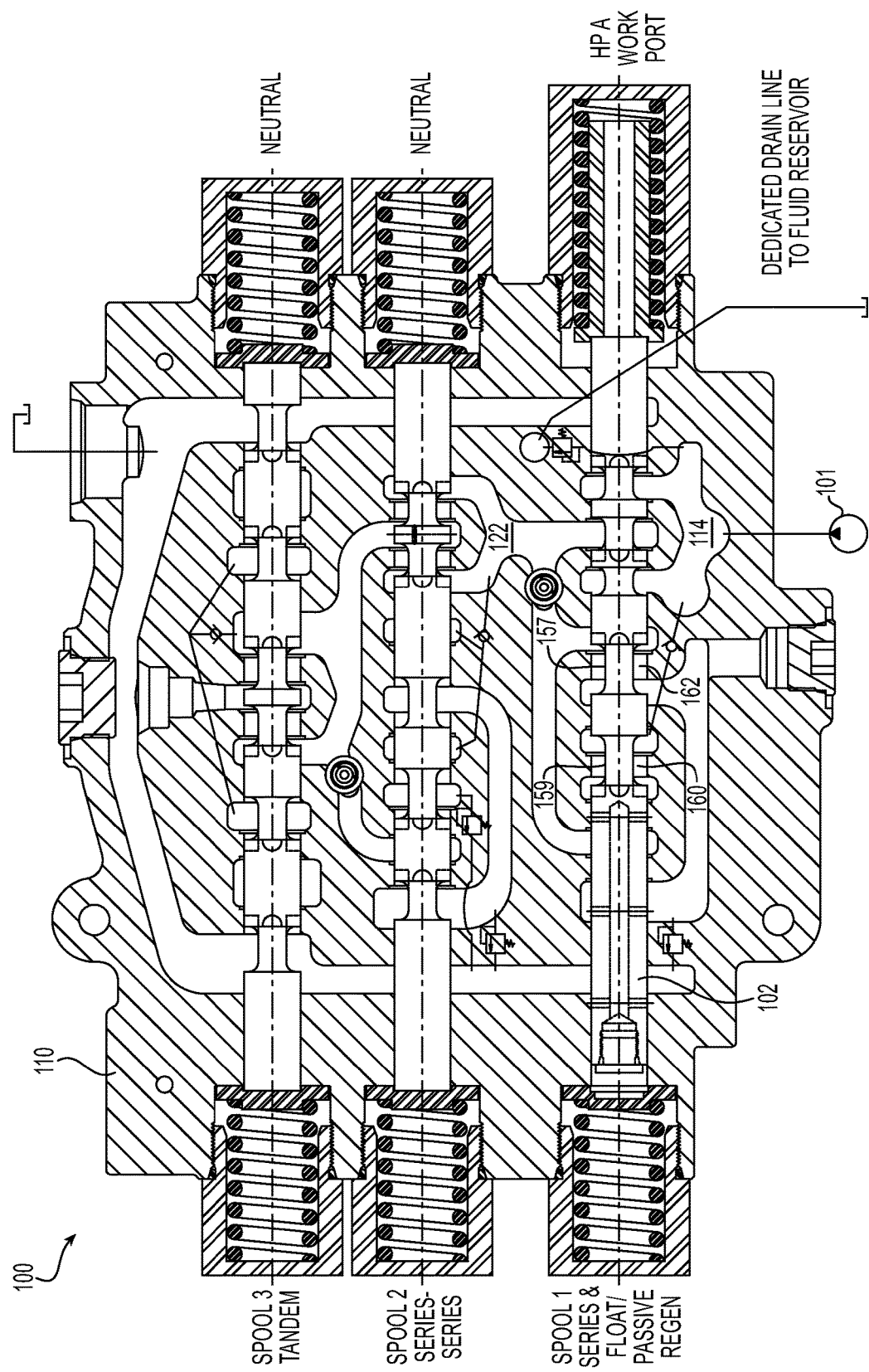
FIG. 4 shows the exemplary hydraulic valve assembly of FIG. 2 with the spool of the first work section displaced to the right.

Shifting valve in the opposite direction to a second position displaced from neutral in a second direction also closes flow paths 152 154 as well as flow paths 156 and 158, and results in the configuration shown in FIG. 4. This second displaced position, however, opens a flow path 160 through recess 159 from the fourth cavity 126 to the fifth cavity 128, thereby fluidly connecting the valve input 114 to the second work port, work port A.

In this position, spool 102 also includes a flow path 162 through recess 157 from the sixth cavity 130 to the seventh cavity 134, thereby fluidly connecting the first work port, work port B, to the input 122 of the downstream valve.

Figure 5:
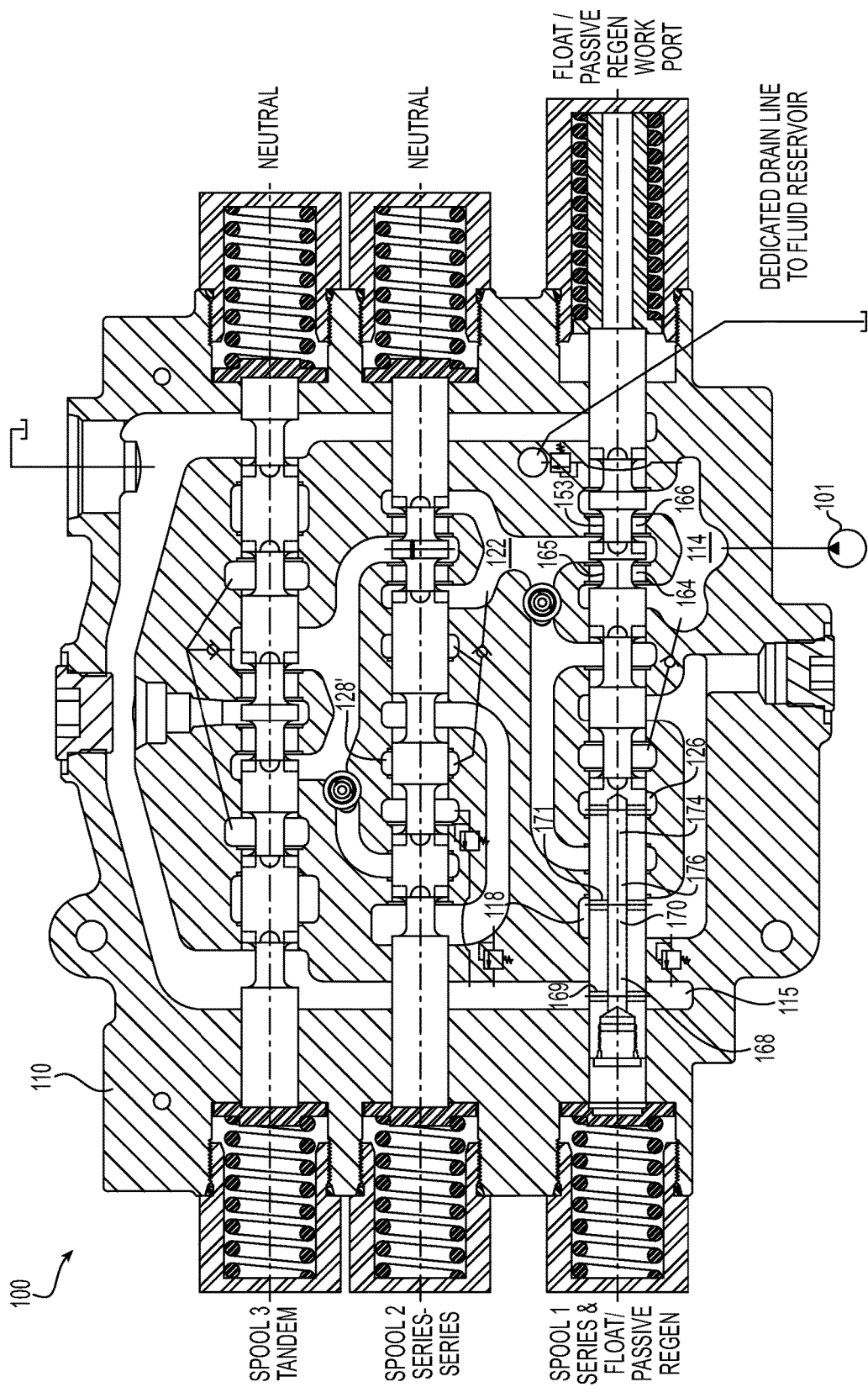
FIG. 5 shows the exemplary hydraulic valve assembly of FIG. 2 with the spool of the first work section displaced further to the right than in FIG. 4.

Moving the spool 102 further in this direction (e.g., to the left in the figures) results in the configuration shown in FIG. 5, enabling a float/passive regeneration function.

The spool 102 now includes a flow path 164 from the eighth cavity 136 to the ninth cavity 138 through recess 165, thereby fluidly connecting the valve input 114 to the input 122 of the downstream valve.

The spool 102 also includes a flow path 166 from the tenth cavity 140 to the ninth cavity 138 through recess 153, thereby fluidly connecting the valve input 114 to the input 122 of the downstream valve.

The spool also includes a flow path 168 from the first cavity 115 to the second cavity 118, thereby fluidly connecting the first work port to the tank 103. As shown, this path is preferably internal to the spool and may include a radial bore 169 opening into a longitudinal bore 170. The longitudinal bore 170 may extend a length approximately equal to the distance between the first and fourth cavities. Opening onto the longitudinal bore 170 may be another radial bore 171, completing the flow path 168.

Opening off the far end of the longitudinal bore 170 may be a third radial bore 172 completing another flow path 174 from the first cavity 115 to the fourth cavity 126, thereby fluidly connecting the second work port to the tank 103.

These bores may also provide a third flow path 176 between the second cavity 118 and the fourth cavity 126, thereby fluidly connecting the first work port to the second work port.

The second worksection from the inlet 104 is either a series or a series/regeneration circuit. The flow paths for the series circuit are the same as described above. The flow path for the regeneration circuit does two things. First, it shuts the communication of the upstream core to the downstream core. This severs the connection between the inlet port and the tank port. Second, it opens communication between the upstream core and both work ports associated with the control spool. This communication will include a transition check valve that allows fluid flow only in the direction of upstream core to the work port cores. The fluid flow will be from the inlet to work port B and work port A. For both a series and regeneration circuit, the cores or cavities of the second bore, starting with the side left of the inlet are as follows: tank, work port B, downstream, work port A, bridge, work port B, bridge, upstream, downstream, upstream, tank. The spool in the bore is configured differently to fulfill a series circuit or a regeneration circuit. In both cases the spools provide external flow paths along the spool axis.

Turning back to FIG. 2, an exemplary series-series valve is shown in the second or middle worksection in a neutral position. The second worksection has substantially the same structure and arrangement as the above-described first worksection, and consequently the foregoing description of the first worksection is equally applicable to the second worksection except as noted below, and reference numbers from features in the first worksection but with a prime designation have been used for corresponding features in the second worksection. Moreover, it will be appreciated upon reading and understanding the specification that aspects of the worksections may be substituted for one another or used in conjunction with one another where applicable. Further, the order of the worksections may be reversed and other same or different worksections may be combined with these two worksections in any useful order as will be understood by one having skill in the art.

The seventh (bridge) cavity 134' is fluidly connected to the valve inlet 122 by passage 129', which also connects to the fifth cavity 128'. As above, a check valve 108' allows fluid flow from the valve inlet 122 to the seventh cavity 134' and prevents flow from the seventh cavity 134' to the valve inlet 122.

Figure 6:
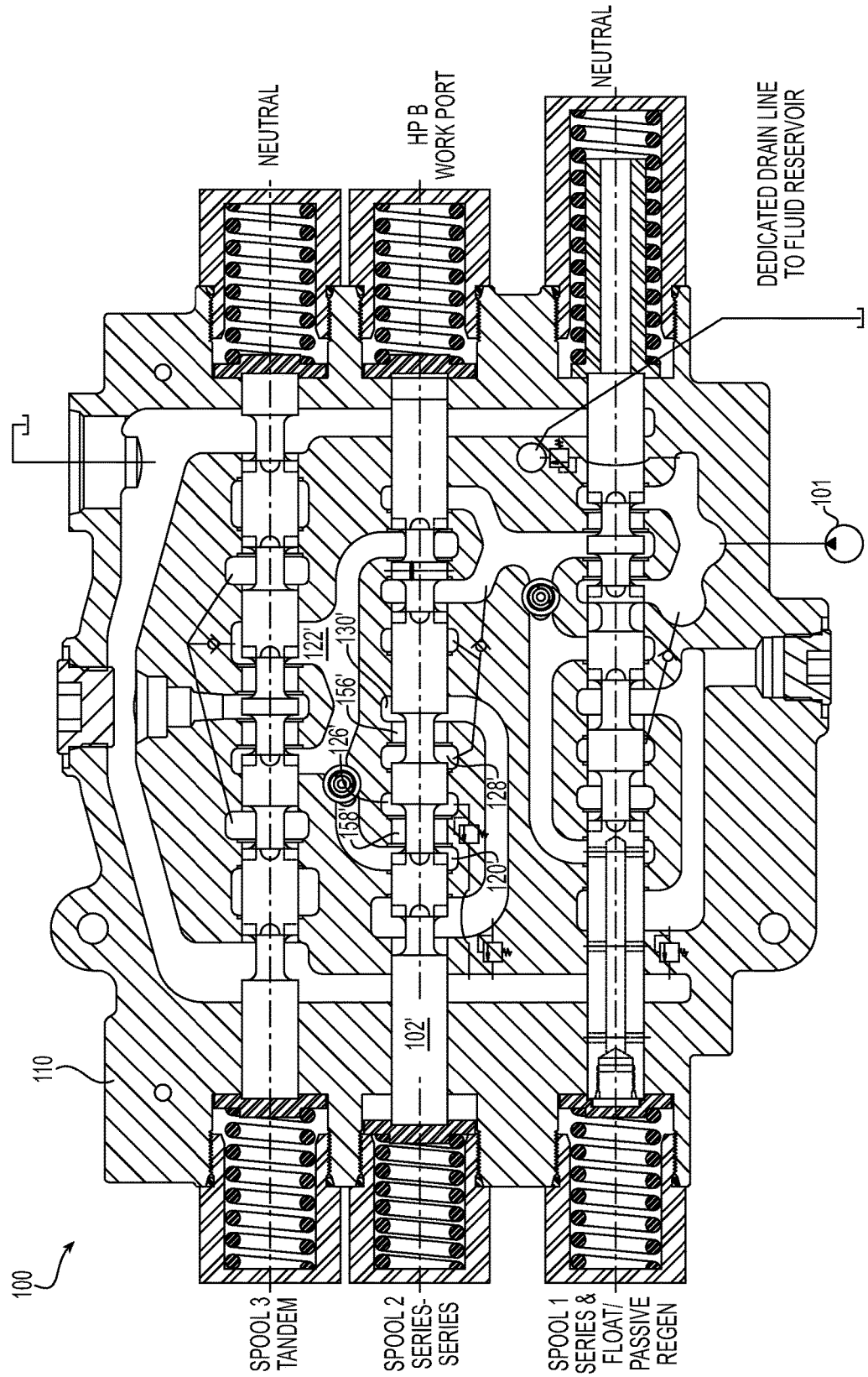
FIG. 6 shows the exemplary hydraulic valve assembly of FIG. 2 with the spool of the second work section displaced to the left.

For a series-series configuration, the spool 102' may be displaced in the first direction (left in this case), as shown in FIG. 6, opening a flow path 158' from the third cavity 120' to the fourth cavity, and a flow path 156' from the fifth cavity 128' to the sixth cavity 130', thereby fluidly connecting the second work port to the input 122' of the downstream valve.

Figure 7:
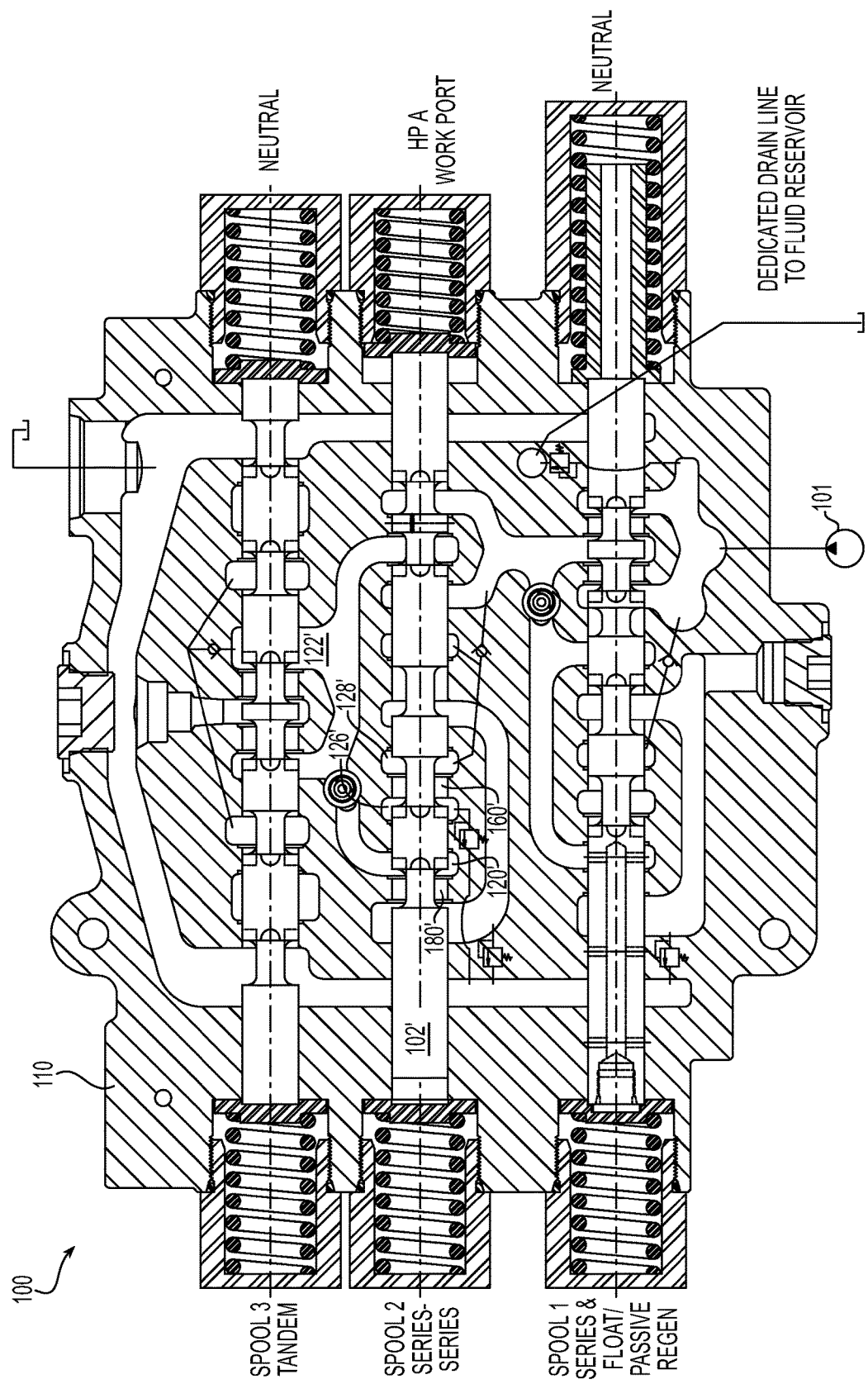
FIG. 7 shows the exemplary hydraulic valve assembly of FIG. 2 with the spool of the second work section displaced to the right.

For a series-series configuration, the spool 102' may be displaced in the second direction (right in this case), as shown in FIG. 7, to open a flow path 180' from the second cavity 118' to the third cavity 120', thereby fluidly connecting the first work port to the input 122' of the downstream valve.

Figure 8:
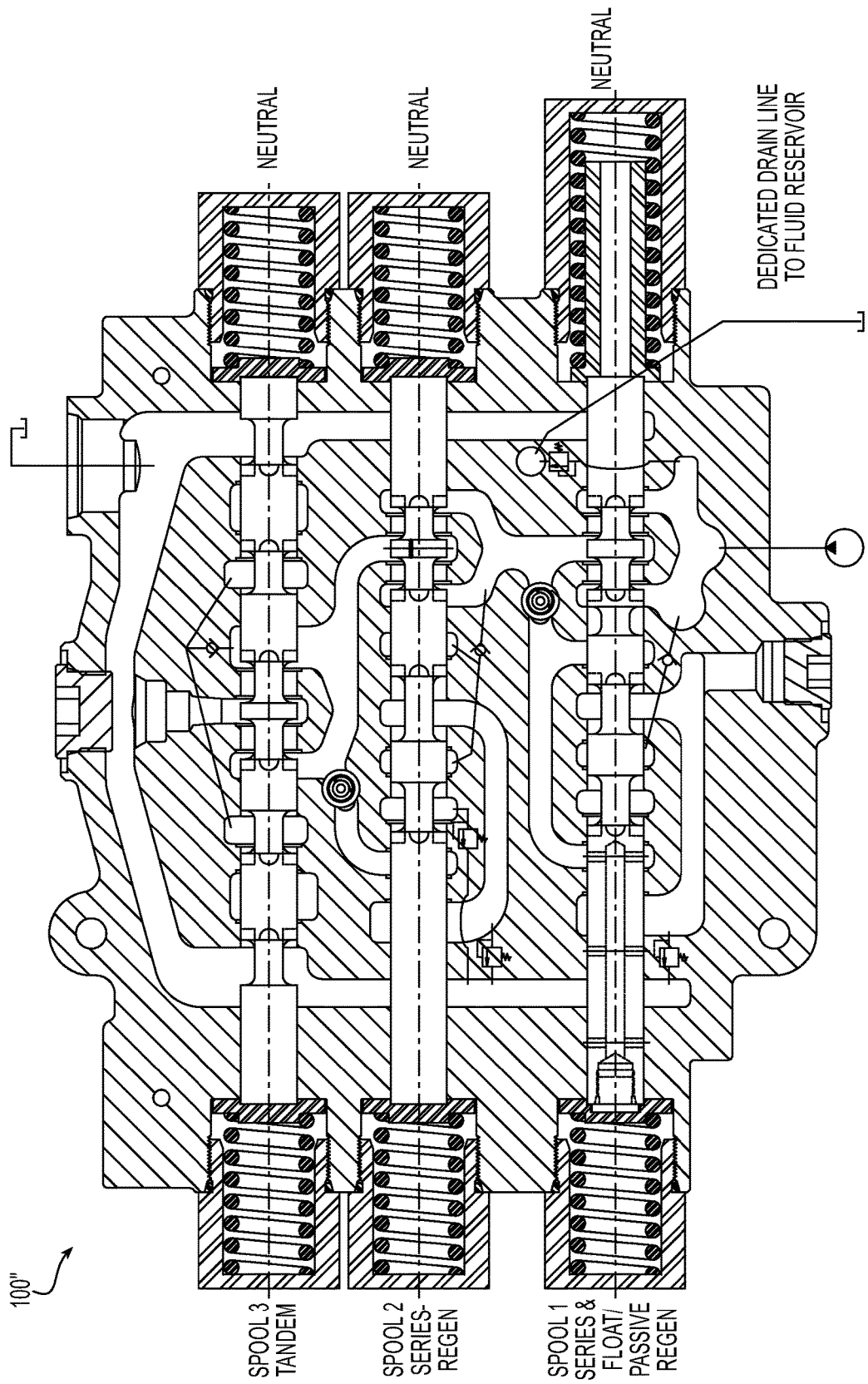
FIG. 8 shows an exemplary hydraulic valve assembly having three work sections with the first work section being a series and float/passive regeneration configuration and the second work section being a series-regeneration configuration.
Figure 9:
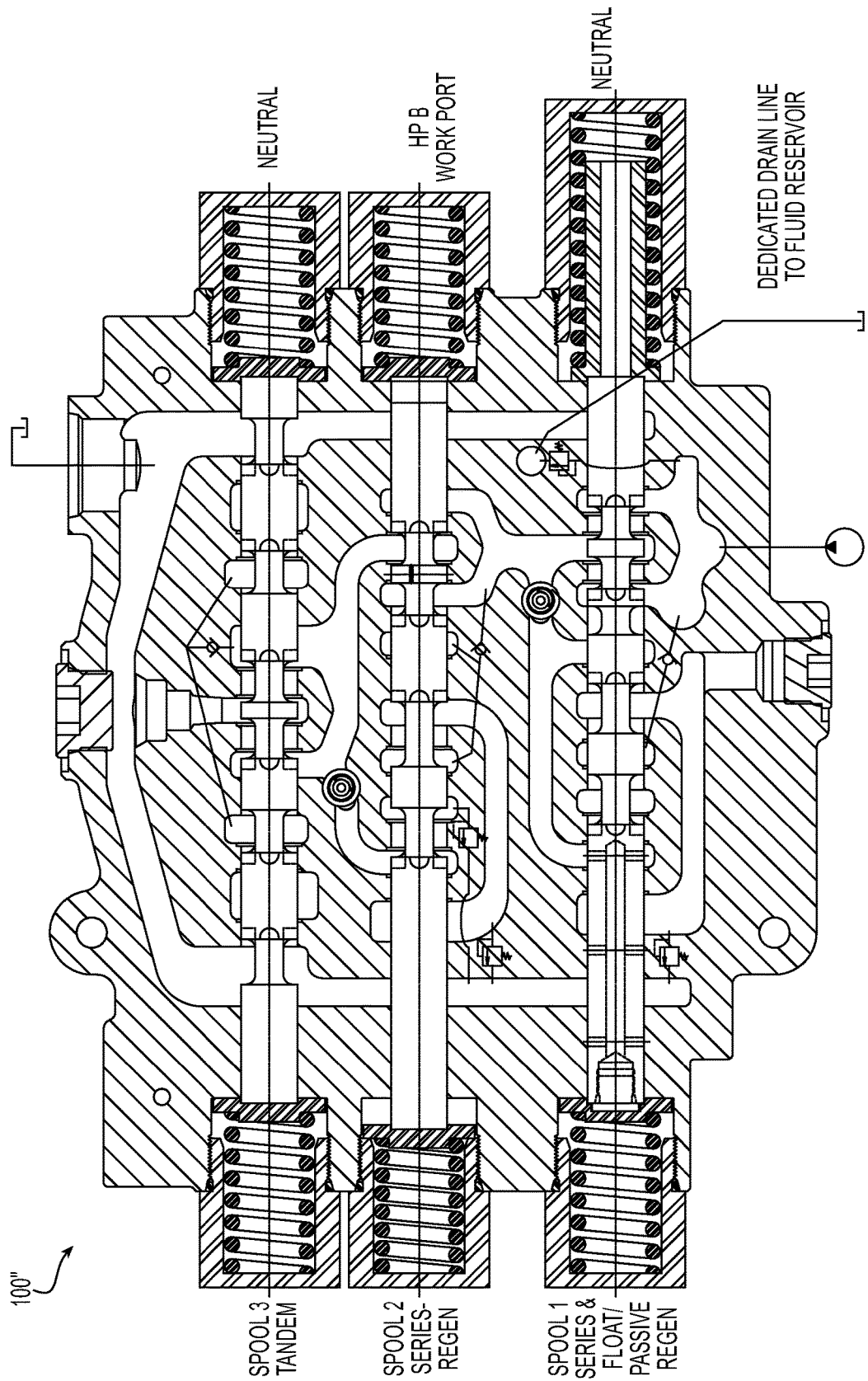
FIG. 9 shows the exemplary hydraulic valve assembly of FIG. 8 with the spool of the second work section displaced to the left.
Figure 10:
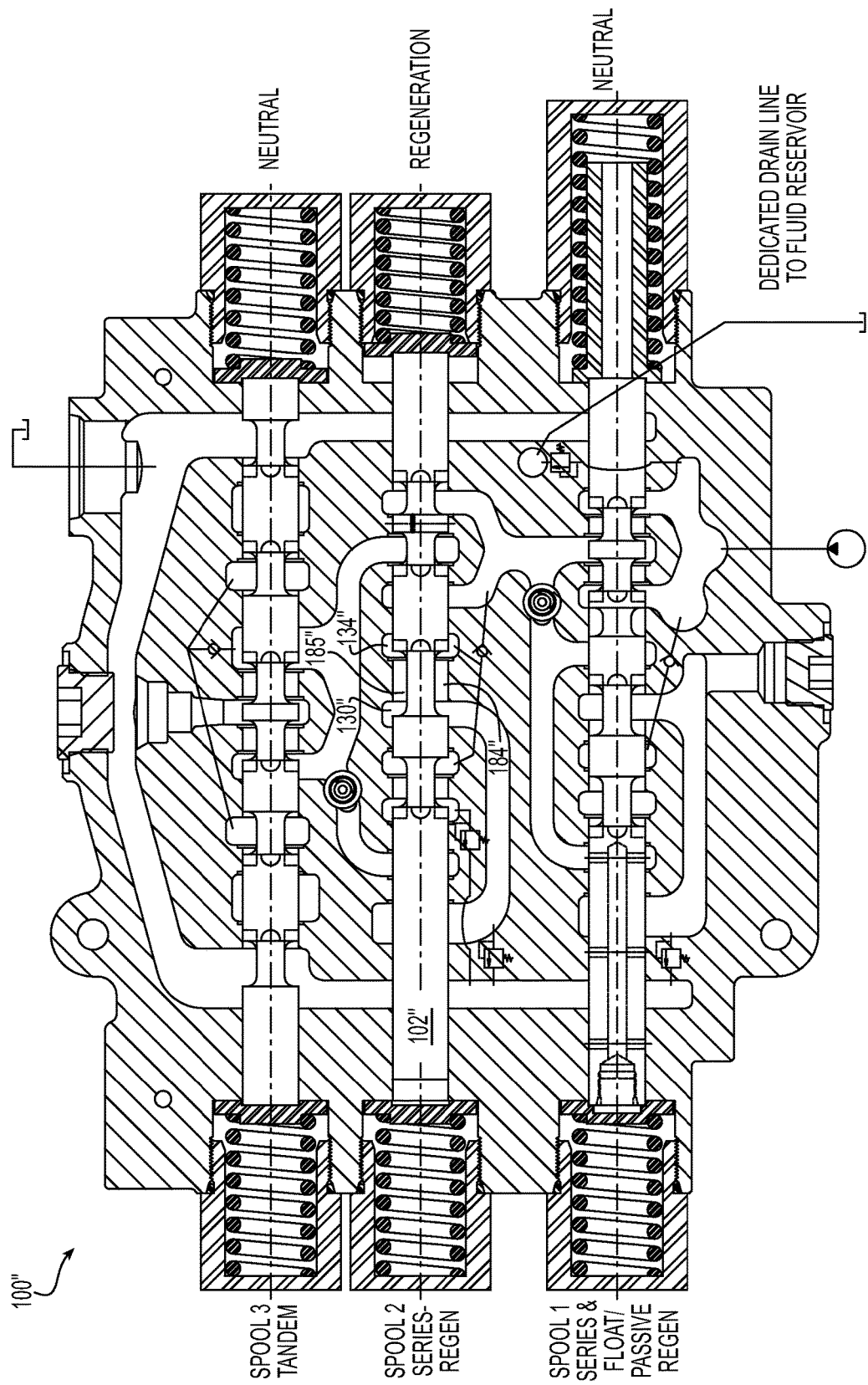
FIG. 10 shows the exemplary hydraulic valve assembly of FIG. 8 with the spool of the second work section displaced to the right.

Turning now to FIGS. 8-10, an exemplary series-regen valve is shown in the second or middle worksection in a neutral position. The second worksection has substantially the same structure and arrangement as the above-described first and second worksections, and consequently the foregoing description of the first and second worksections is equally applicable to the series-regen worksection except as noted below, and reference numbers from features in the first worksection but with a double prime designation have been used for corresponding features in the second worksection. Moreover, it will be appreciated upon reading and understanding the specification that aspects of the worksections may be substituted for one another or used in conjunction with one another where applicable. Further, the order of the worksections may be reversed and other same or different worksections may be combined with these two worksections in any useful order as will be understood by one having skill in the art.

For a series-regen configuration, as shown in FIG. 10, spool 102" includes a flow path 184" through recess 185" from the seventh cavity 134" to the sixth cavity 130" when the spool is in a second position displaced from neutral in a second direction (opposite the first direction, i.e., to the right in FIG. 10), thereby fluidly connecting the first work port to the second work port to provide extra flow to the second work port beyond that supplied via the valve inlet by a pump 101. It is noted that in this configuration, the second cavity is not fluidly connected to the third cavity by a flow path through the spool as in FIG. 5.

Figure 11:
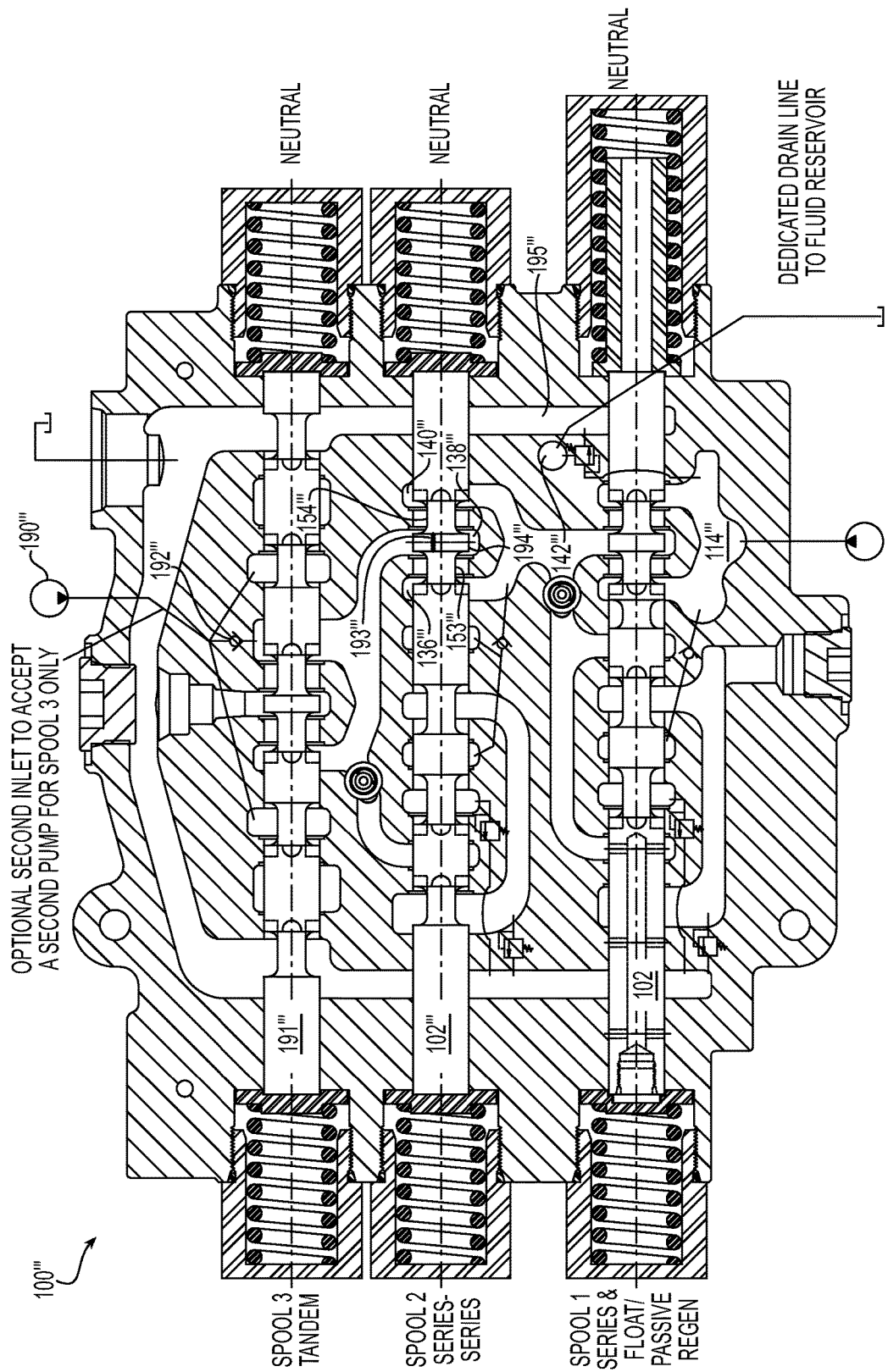
FIG. 11 shows another exemplary hydraulic valve assembly.

Turning now to FIG. 11, an exemplary assembly is shown at 100'''. The assembly 100''' has substantially the same structure and arrangement as the above-described assemblies, and consequently the foregoing description of the assemblies is equally applicable to this assembly except as noted below, and reference numbers from features in the other assemblies but with a triple prime designation have been used for corresponding features in the assembly 100'''. Moreover, it will be appreciated upon reading and understanding the specification that aspects of the assemblies may be substituted for one another or used in conjunction with one another where applicable.

The assembly 100''' may include a second pump 190''' that provides fluid to the third spool only. The flow from the second pump 190''' is introduced to the third spool 191''' downstream of the transition check valve 192''', so the fluid cannot go to the two upstream spools.

Optionally provided in the second spool 102''' is an orifice 193''' shown in hidden lines in the spool web 194''' between recesses 153'''' and 154''''. With the orifice 193''', there is a constant bleed between cavity 136''' and 138''' if the spool 102''' is moved to the left and between 140''' and 138''' if the spool 102''' is moved to the right. The orifice 193''' is there to allow the first spool 102 to continue moving if both spools are operating simultaneously and the second spool's movable function has reached it movable limit and stops. If the first spool's movable function is still operating, it will be able to continue to move because the oil exiting the movable function of the first work section can go to tank via the orifice 193'''. The movable function will move slowly, but it will still move.

Optionally, the inlet 114''' of the first worksection may be fluidly connected to a dedicated drain line 142''' and fluidly connected to tank cavity 195''' via a pressure relief valve 144'''. The pressure relief valve may be set to at approximately 4000 psi, for example, in order to prevent damage to upstream system components such as pumps and hoses and downstream system components such as hoses and actuators. The inlet pressure will rise due to the working of the movable machine members. Once the inlet pressure minus the drain pressure is higher than the relief valve setting, the relief opens the connection from the inlet to tank. Instead of directing all of its exhaust flow to the drain line as in other embodiments, the exhaust flow is now going to tank, and only the chamber where the spring resides is going to drain.

The third spool from the inlet is a tandem circuit. To construct the tandem circuit, the spool and core arrangement does three things whenever the spool is moved to energize a work port. First, it shuts the communication of the upstream core to the downstream core. This severs the connection between the inlet port and the tank port. Second, it opens communication from the upstream core to one of the work ports associated with the control spool. This communication will include a transition check valve that allows fluid flow only in the direction of upstream core to the work port cores. Third, it opens communication from the other work port, associated with the control spool, to the tank core, which is connected to the tank port. This opening and shutting of the different cores will allow the fluid flow to be from the inlet to work port B to the movable member on the machine to work port A to tank. If the spool is moved in the opposite direction, the same event occurs, but the fluid flow direction is reversed. The fluid flow will be from the inlet to work port A to the movable member on the machine to work port B to tank. Both of these fluid flows describe a tandem circuit. The core arrangement for this circuitry is omitted herein for brevity, although the arrangement and operation thereof may be seen in detail in the accompanying figures.

The control of the control spools may be accomplished by methods common to hydraulic valves. They may be biased to the neutral position by springs. If the control method is to be by mechanical means, the biasing springs may reside on one end of each spool. The opposite end of each spool may protrude outside the boundaries of the monocast body and provide a means to connect a linkage or handles or cylinders to the control spools. If the control method is with variable hydraulic pressure, the springs may be on each end of each spool. The hydraulic pressure that is varying to control the motion of the control spools may be controlled by proportional pressure reducing valves. If these proportional pressure reducing valves are external to the monocast body, they may be connected to the monocast body with hoses or piping to individual control ports that communicate to each end of each control spool. This variable control pressure can also be accomplished with electrically controlled proportion pressure reducing valves that reside in the control ports. When using these incumbent electrically controlled proportional pressure reducing valves, a pilot supply and a pilot drain outlet may be provided to allow the electrically controlled proportional pressure reducing valves to function.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic valve assembly comprising:
a valve body having a spool bore, a valve inlet, and a plurality of cavities opening into the spool bore; and
a spool disposed in the spool bore,
wherein the plurality of cavities includes:
a first cavity fluidly connected to a tank passage;
a second cavity adjacent the first cavity and fluidly connected to a first work port;
a third cavity adjacent the second cavity and fluidly connected to an inlet of another valve;
a fourth cavity adjacent the third cavity and fluidly connected to a second work port;
a fifth cavity adjacent the fourth cavity and fluidly connected to the valve inlet regardless of the spool's position;
a sixth cavity adjacent the fifth cavity and fluidly connected to the first work port regardless of the spool's position;
a seventh cavity adjacent the sixth cavity;
an eighth cavity adjacent the seventh cavity and fluidly connected to the valve inlet regardless of the spool's position;
a ninth cavity adjacent the eighth cavity and fluidly connected to the inlet of the other valve; and
a tenth cavity adjacent the ninth cavity and fluidly connected to the valve inlet.

2. The hydraulic valve assembly of claim 1, wherein the fifth cavity is fluidly connected to the valve inlet via a check valve, the check valve allowing fluid flow from the valve inlet to the fifth cavity and preventing fluid flow from the fifth cavity to the valve inlet.

3. The hydraulic valve assembly of claim 1, wherein the third cavity is fluidly connected to the inlet of the other valve via a check valve, the check valve preventing fluid flow from the inlet of the other valve to the third cavity and allowing fluid flow from the third cavity to the inlet of the other valve.

4. The hydraulic valve assembly of claim 1, wherein the seventh cavity is fluidly connected to the inlet of the other valve.

5. The hydraulic valve assembly of claim 4, wherein the seventh cavity is fluidly connected to the third cavity.

6. The hydraulic valve assembly of claim 4, wherein the seventh cavity is fluidly connected to the inlet of the other valve via a check valve, the check valve allowing flow from the seventh cavity to the inlet of the other valve and preventing flow from the inlet of the other valve to the seventh cavity.

7. The hydraulic valve assembly of claim 1, wherein the inlet is connected to a dedicated drain line via a pressure relief valve.

8. The hydraulic valve assembly of claim 1, wherein the seventh cavity is fluidly connected to the valve inlet.

9. The hydraulic valve assembly of claim 8, wherein the seventh cavity is fluidly connected to the fifth cavity.

10. The hydraulic valve assembly of claim 8, wherein the seventh cavity is fluidly connected to the valve inlet via a check valve, the check valve allowing fluid flow from the valve inlet to the seventh cavity and preventing flow from the seventh cavity to the valve inlet.

11. The hydraulic valve assembly of claim 1, wherein the fourth cavity is fluidly connected to the tank passage via a pressure relief valve, and the second cavity is fluidly connected to the tank passage via a pressure relief valve.

12. The hydraulic valve assembly of claim 1, wherein the spool includes a flow path from the eighth cavity to the ninth cavity when the spool is in a neutral position, thereby fluidly connecting the valve inlet to the inlet of the other valve.

13. The hydraulic valve assembly of claim 1, wherein the spool includes a flow path from the tenth cavity to the ninth cavity when the spool is in a neutral position, thereby fluidly connecting the valve inlet to the inlet of the other valve.

14. The hydraulic valve assembly of claim 1, wherein the spool includes a flow path from the fifth cavity to the sixth cavity when the spool is in a first position displaced from neutral in a first direction, thereby fluidly connecting the valve inlet to the first work port.

15. The hydraulic valve assembly of claim 1, wherein the spool includes a flow path from the third cavity to the fourth cavity when the spool is in a first position displaced from neutral in a first direction thereby fluidly connecting the second work port to the inlet of the other valve.

16. The hydraulic valve assembly of claim 1, wherein the spool includes a flow path from the fourth cavity to the fifth cavity when the spool is in a second position displaced from neutral in a second direction, thereby fluidly connecting the valve inlet to the second work port.

17. The hydraulic valve assembly of claim 1, wherein the spool includes a flow path from the sixth cavity to the seventh cavity when the spool is in a second position displaced from neutral in a second direction, thereby fluidly connecting the first work port to the inlet of the other valve.

18. The hydraulic valve assembly of claim 1, wherein the spool includes a flow path from the first cavity to the second cavity when the spool is in a third position displaced from neutral in the second direction, thereby fluidly connecting the first work port to the tank passage.

19. The hydraulic valve assembly of claim 1, wherein the spool includes a flow path from the first cavity to the fourth cavity when the spool is in a third position displaced from neutral in the second direction, thereby fluidly connecting the second work port to the tank passage.

20. The hydraulic valve assembly of claim 1, wherein the spool includes a flow path from the second cavity to the fourth cavity when the spool is in a third position displaced from neutral in the second direction, thereby fluidly connecting the first work port to the second work port.

21. The hydraulic valve assembly of claim 1, wherein the spool includes a flow path from the second cavity to the third cavity when the spool is in a second position displaced from neutral in a second direction thereby fluidly connecting the first work port to the inlet of the other valve.

22. The hydraulic valve assembly of claim 1, wherein the spool includes a flow path from the seventh cavity to the sixth cavity when the spool is in a second position displaced from neutral in a second direction, thereby fluidly connecting the first work port to the second work port to provide extra flow to the second work port beyond that supplied via the valve inlet by a pump.

23. The hydraulic valve assembly of claim 1, further comprising:
a second spool,
wherein the valve body further comprises a second spool bore that the second spool is disposed in, a second valve inlet, and a second plurality of cavities opening into the second spool bore, and
wherein the second plurality of cavities includes:
a second first cavity fluidly connected to the tank passage;
a second second cavity adjacent the second first cavity and fluidly connected to the first work port;
a second third cavity adjacent the second second cavity and fluidly connected to an inlet of a second other valve;
a second fourth cavity adjacent the second third cavity and fluidly connected to the second work port;
a second fifth cavity adjacent the second fourth cavity and fluidly connected to the second valve inlet regardless of the second spool's position;
a second sixth cavity adjacent the second fifth cavity and fluidly connected to the first work port regardless of the second spool's position;
a second seventh cavity adjacent the second sixth cavity, wherein the second seventh cavity is fluidly connected to the second valve inlet;
a second eighth cavity adjacent the second seventh cavity and fluidly connected to the second valve inlet regardless of the second spool's position;
a second ninth cavity adjacent the second eighth cavity and fluidly connected to the inlet of the second other valve; and
a second tenth cavity adjacent the second ninth cavity and fluidly connected to the second valve inlet.

24. A hydraulic valve assembly comprising:
a valve body having a spool bore, a valve inlet, and a plurality of cavities opening into the spool bore; and
a spool disposed in the spool bore,
wherein the plurality of cavities includes:
a first cavity fluidly connected to a tank passage;
a second cavity adjacent the first cavity and fluidly connected to a first work port;
a third cavity adjacent the second cavity and fluidly connected to an inlet of another valve;
a fourth cavity adjacent the third cavity and fluidly connected to a second work port;
a fifth cavity adjacent the fourth cavity and fluidly connected to the valve inlet;
a sixth cavity adjacent the fifth cavity and fluidly connected to the first work port;
a seventh cavity adjacent the sixth cavity;
an eighth cavity adjacent the seventh cavity and fluidly connected to the valve inlet;
a ninth cavity adjacent the eighth cavity and fluidly connected to the inlet of the other valve; and
a tenth cavity adjacent the ninth cavity and fluidly connected to the valve inlet;
wherein the eighth cavity is directly fluidly connected to the valve inlet.

25. A hydraulic valve assembly comprising:
a valve body having a spool bore, a valve inlet, and a plurality of cavities opening into the spool bore; and
a spool disposed in the spool bore,
wherein the plurality of cavities includes:
a first cavity fluidly connected to a tank passage;
a second cavity adjacent the first cavity and fluidly connected to a first work port;
a third cavity adjacent the second cavity and fluidly connected to an inlet of another valve;
a fourth cavity adjacent the third cavity and fluidly connected to a second work port;
a fifth cavity adjacent the fourth cavity and fluidly connected to the valve inlet;
a sixth cavity adjacent the fifth cavity and fluidly connected to the first work port;
a seventh cavity adjacent the sixth cavity;
an eighth cavity adjacent the seventh cavity and fluidly connected to the valve inlet;
a ninth cavity adjacent the eighth cavity and fluidly connected to the inlet of the other valve; and
a tenth cavity adjacent the ninth cavity and fluidly connected to the valve inlet;
wherein the ninth cavity is directly fluidly connected to the inlet of the other valve.

26. A hydraulic valve assembly comprising:
a valve body having a spool bore, a valve inlet, and a plurality of cavities opening into the spool bore; and
a spool disposed in the spool bore,
wherein the plurality of cavities includes:
a first cavity fluidly connected to a tank passage;
a second cavity adjacent the first cavity and fluidly connected to a first work port;
a third cavity adjacent the second cavity and fluidly connected to an inlet of another valve;
a fourth cavity adjacent the third cavity and fluidly connected to a second work port;
a fifth cavity adjacent the fourth cavity and fluidly connected to the valve inlet;
a sixth cavity adjacent the fifth cavity and fluidly connected to the first work port;
a seventh cavity adjacent the sixth cavity;
an eighth cavity adjacent the seventh cavity and fluidly connected to the valve inlet;
a ninth cavity adjacent the eighth cavity and fluidly connected to the inlet of the other valve; and
a tenth cavity adjacent the ninth cavity and fluidly connected to the valve inlet;
wherein the tenth cavity is directly fluidly connected to the valve inlet.

* * * * *